United States Patent
Ito et al.

(10) Patent No.: US 9,525,293 B2
(45) Date of Patent: Dec. 20, 2016

(54) BATTERY CHARGER HAVING ANGLED WALL IN BATTERY RECEIVING OPENING, AND BATTERY PACK CHARGING SYSTEM AND CORDLESS POWER TOOL SYSTEM INCLUDING SAME

(71) Applicant: MAKITA CORPORATION, Anjo-Shi (JP)

(72) Inventors: Kosuke Ito, Anjo (JP); Hitoshi Suzuki, Anjo (JP); Akira Naito, Anjo (JP)

(73) Assignee: MAKITA CORPORATION, Anjo-Shi (JP)

( * ) Notice: Subject to any disclaimer, the term of this patent is extended or adjusted under 35 U.S.C. 154(b) by 192 days.

(21) Appl. No.: 14/369,708

(22) PCT Filed: Dec. 25, 2012

(86) PCT No.: PCT/JP2012/008288
§ 371 (c)(1),
(2) Date: Jun. 29, 2014

(87) PCT Pub. No.: WO2013/099228
PCT Pub. Date: Jul. 4, 2013

(65) Prior Publication Data
US 2015/0015205 A1    Jan. 15, 2015

Related U.S. Application Data

(60) Provisional application No. 61/581,943, filed on Dec. 30, 2011, provisional application No. 61/702,559, filed on Sep. 18, 2012.

(51) Int. Cl.
*H02J 7/00* (2006.01)
*H02J 7/02* (2016.01)
*H02J 5/00* (2016.01)

(52) U.S. Cl.
CPC ............ *H02J 7/0045* (2013.01); *H02J 7/0027* (2013.01); *H02J 7/0044* (2013.01); *H02J 7/02* (2013.01); *H02J 7/025* (2013.01); *H02J 5/005* (2013.01)

(58) Field of Classification Search
CPC ....... Y02E 60/12; H02J 7/0042; H02J 7/0045; H02J 7/0044; H01M 10/46; A45F 2005/002

(Continued)

(56) References Cited

U.S. PATENT DOCUMENTS

| | | | | |
|---|---|---|---|---|
| 6,204,632 | B1 * | 3/2001 | Nierescher | H02J 7/0013 320/106 |
| 2006/0108970 | A1 * | 5/2006 | Leasure | B25H 3/02 320/101 |

(Continued)

FOREIGN PATENT DOCUMENTS

| | | |
|---|---|---|
| EP | 0470754 A | 2/1992 |
| GB | 2124839 A | 2/1984 |

(Continued)

OTHER PUBLICATIONS

International Search Report from PCT/JP2012/008288.
Written Opinion from PCT/JP2012/008288.

*Primary Examiner* — Arun Williams
(74) *Attorney, Agent, or Firm* — Jeffrey D. Tekanic; Scott T. Wakeman; J-Tek Law PLLC

(57) ABSTRACT

A charger (40; 240; 340) charges a battery pack (20) that is detachably attachable to a cordless power tool (12). The charger has at least a first side wall (44b) that at least partially defines a battery pack receiving hole (44; 244) shaped to receive and accommodate the battery pack. A charging output element (62; 362) supplies charging power to the battery pack. The battery pack receiving hole has a lateral cross sectional area that decreases downwardly in the (Continued)

vertical direction of the battery pack receiving hole such that gravity causes the battery pack to be guided to a prescribed position within the battery pack receiving hole. In addition, the charging output element is positioned so as to be proximal to a corresponding charging power input element of the battery pack when the battery pack is disposed in the prescribed position.

25 Claims, 7 Drawing Sheets

(58) Field of Classification Search
USPC .......................................................... 320/113
See application file for complete search history.

(56) References Cited

U.S. PATENT DOCUMENTS

| | | | |
|---|---|---|---|
| 2006/0113956 A1 | 6/2006 | Bublitz et al. | |
| 2006/0170395 A1* | 8/2006 | Yoshimizu ............. | B25H 3/006 320/114 |
| 2009/0276637 A1 | 11/2009 | Coonan et al. | |
| 2010/0171367 A1 | 7/2010 | Kitamura et al. | |

FOREIGN PATENT DOCUMENTS

| | | | |
|---|---|---|---|
| JP | 2005073350 A | 3/2005 |
| JP | 2009262254 A | 11/2009 |
| JP | 2010206871 A | 9/2010 |
| JP | 2010226890 A | 10/2010 |
| JP | 2011034793 | 2/2011 |
| JP | 4835697 B2 | 12/2011 |
| JP | 5569717 B2 | 8/2014 |
| WO | 2006044693 A | 4/2006 |

\* cited by examiner

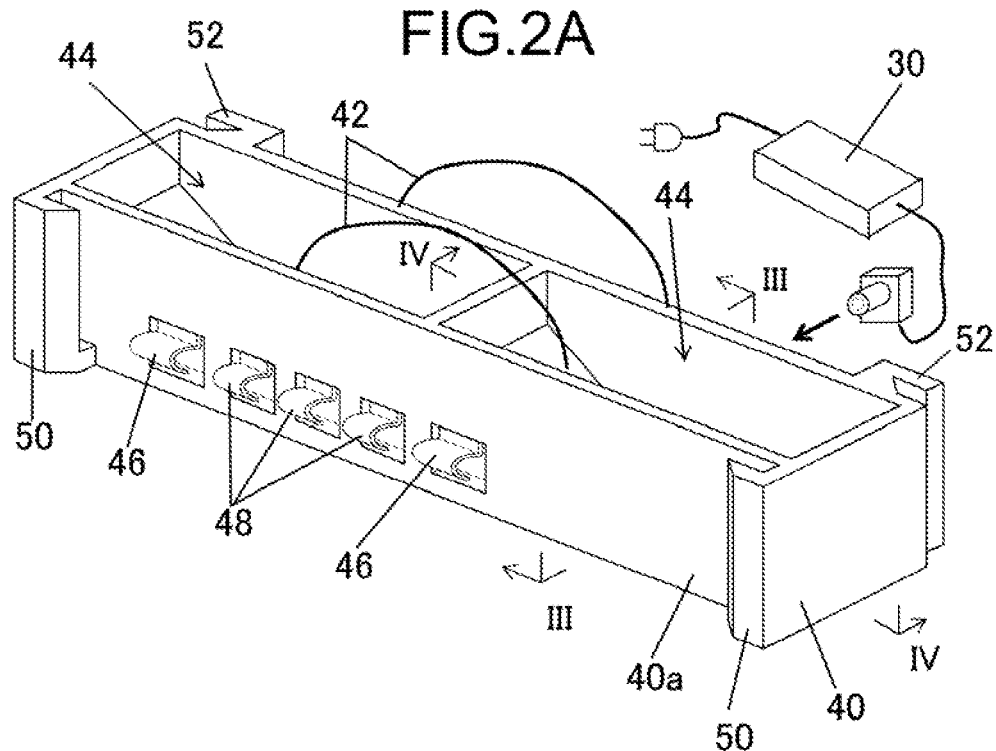
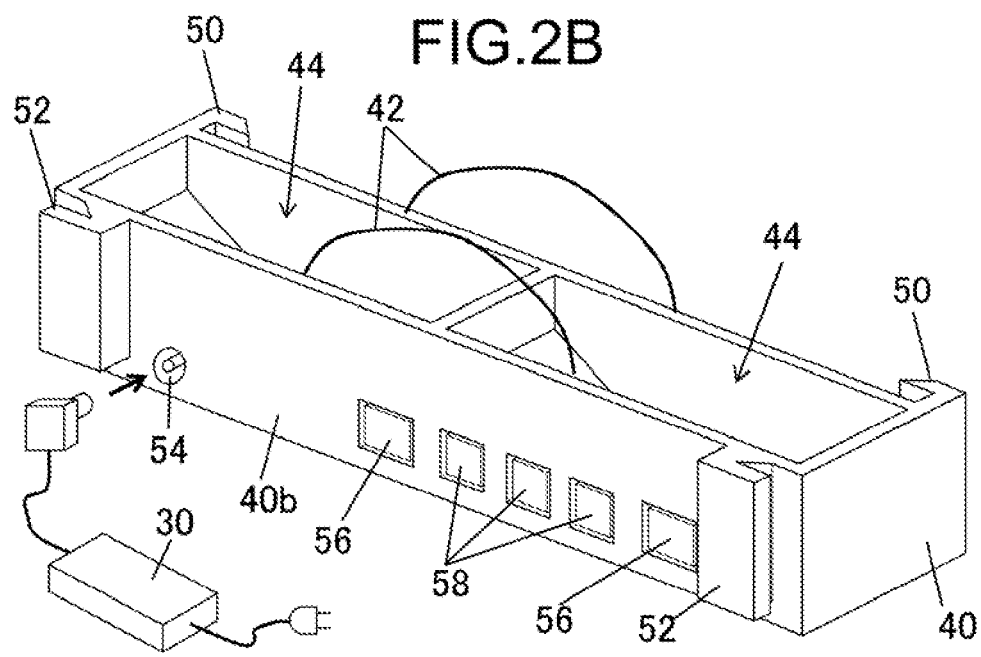

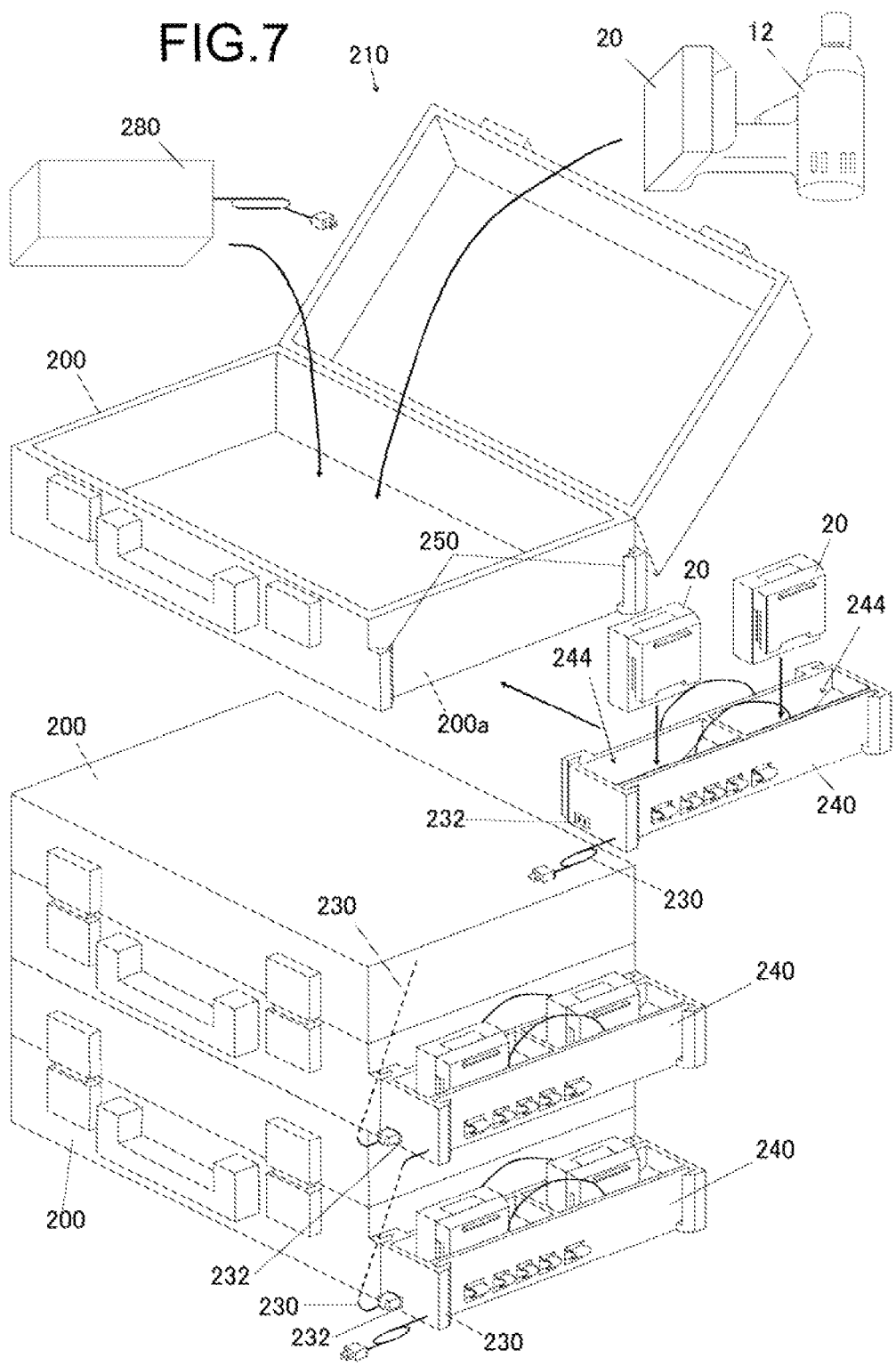

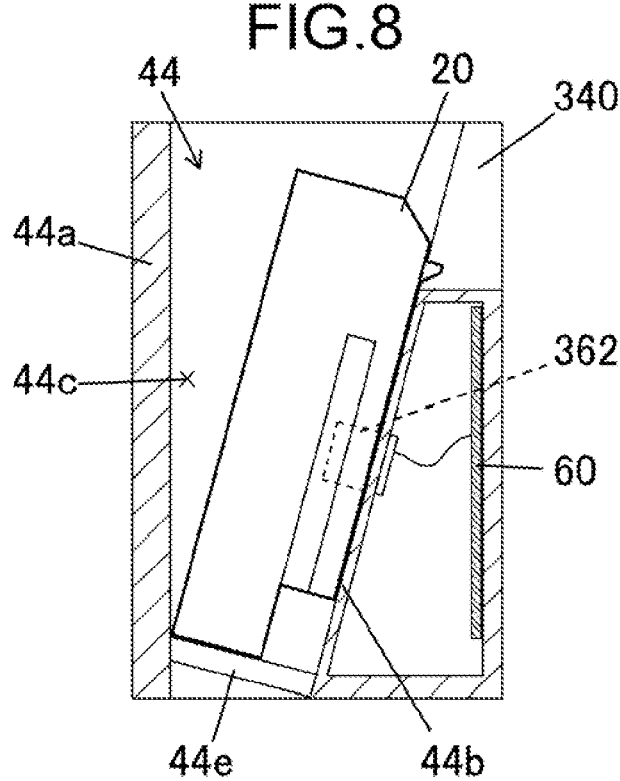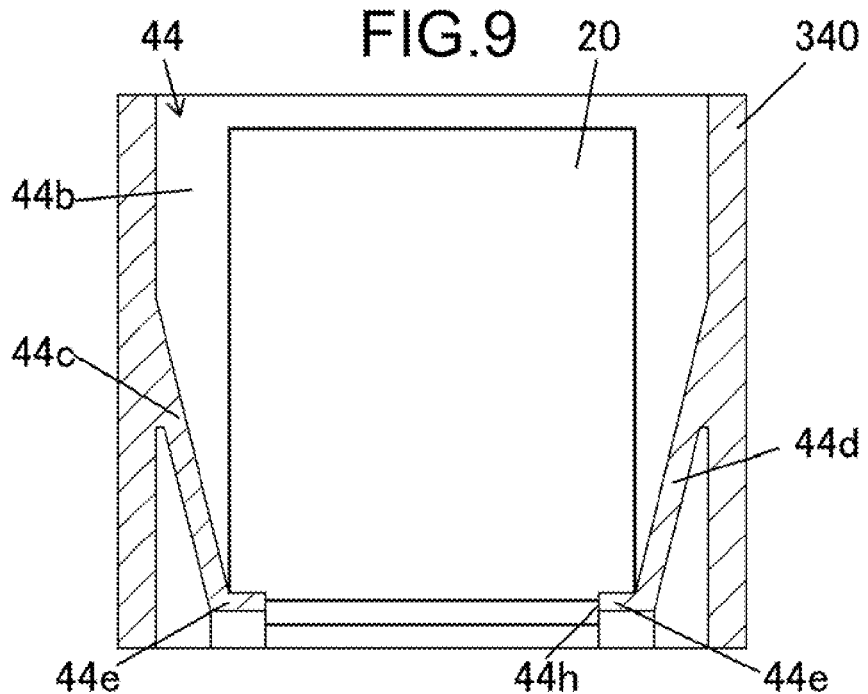

BATTERY CHARGER HAVING ANGLED WALL IN BATTERY RECEIVING OPENING, AND BATTERY PACK CHARGING SYSTEM AND CORDLESS POWER TOOL SYSTEM INCLUDING SAME

CROSS-REFERENCE

The present application is the U.S. National Stage of International Application No. PCT/JP2012/008288, filed Dec. 25, 2012, which claims priority to U.S. provisional patent application Ser. No. 61/581,943 filed on Dec. 30, 2011 and U.S. provisional patent application Ser. No. 61/702,559 filed on Sep. 18, 2012, the contents of both of which are incorporated fully herein.

TECHNICAL FIELD

The present invention generally relates to a charger for charging a battery pack that is detachably attachable to a cordless power tool, to a battery pack charging system containing the same and to a cordless power tool system containing the same.

BACKGROUND ART

A cordless power tool system is disclosed in WO2006/044693A2. This system comprises a power tool, a battery pack, which can be attached to and detached from the power tool, and a charger, which charges the battery pack.

With such a cordless power tool, an external power supply (e.g., an electrical outlet) is not needed to operate the power tool. Instead, the user needs to charge the battery pack beforehand. The battery pack is charged (recharged) using the charger.

The charger is configured such that the battery pack can be attached to and detached from the charger. When the battery pack is attached, the charger automatically starts charging the battery pack. During the charging of the battery pack, the charger controls the charging current and the charging voltage supplied to the battery pack, while monitoring the temperature and the voltage of the battery pack. When the battery pack reaches a full charge, the charger automatically stops charging the battery pack. During this interval, the user need not take any action to facilitate the charging operation.

SUMMARY

As discussed above, when the battery pack is properly attached to the charger, the battery pack will be automatically charged. On the other hand, if the battery pack is not properly attached to the charger, the charging operation will not begin. Therefore, many users have experienced the frustrating situation in which, just as the user is about to use the power tool, the user unexpectedly finds that the battery pack has not been charged because the battery pack was not correctly attached to the charger. In such a case, the user then needs to correctly attach the battery pack to the charger and wait once again until the battery pack reaches full charge. During that interval, the user cannot perform his or her scheduled work.

It is therefore an object of the present teachings to provide techniques for charging battery packs that reduce the possibility of human error.

This object is achieved by the charger of claim 1, the battery pack charging system of claim 16 and the cordless power tool system of claim 18. Further developments of the inventive subject matter are recited in the dependent claims.

In one aspect of the present teachings, a cordless power tool system preferably comprises: a power tool; a battery pack, which can be attached to and detached from the power tool; and a charger, which charges the battery pack. The charger preferably has a battery pack housing (receiving) hole, which receives the battery pack, and a charging output part (element), which outputs charging power to the battery pack that has been placed into the battery pack housing hole. The battery pack housing hole preferably has a cross sectional area that decreases in a downward direction, such that the battery pack will be guided by its intrinsic weight (i.e. by gravity) to a prescribed position within the battery pack housing hole, i.e. the battery pack can slide along one or more inclined or tilted surfaces of the battery pack housing hole to a lowermost position within the battery pack housing hole, which corresponds to the prescribed position. The charging output part preferably is disposed, relative to the battery pack housing hole, such that it can transmit charging power to, and/or electrically connect with, the battery pack when the battery pack has moved to the prescribed position.

In chargers according to the present teachings, the cross sectional area of the battery pack housing hole is relatively large at an upper part thereof and smaller at a lower part thereof. Because the upper opening area of the battery pack housing hole is relatively large, the battery pack can be easily put into the battery pack housing hole and the user does not have to pay careful attention to the placement of the battery pack within the battery pack housing hole. But, since the cross sectional area inside the battery pack housing hole decreases or tapers in the downward direction, the battery pack that has been put into the battery pack housing hole will reliably move (slide) toward the prescribed position due to its own weight (gravity) while being guided by one or more side walls of the battery pack housing hole. When the battery pack has moved to the prescribed position (e.g., a lowermost position of the battery pack within the battery pack housing hole), the charging output part will automatically begin transmitting (wirelessly or by conducting current via a wire) charging power to the battery pack. According to this system, the battery pack can be reliably charged even if the user puts the battery pack into the battery pack housing hole in a rough or careless manner, i.e. without paying special attention to the location of charging terminals or a charging output power element within the battery pack housing hole.

BRIEF DESCRIPTION OF DRAWINGS

FIG. 2A and FIG. 2B show a charger of the power tool system of the first embodiment from a front side and a rear side, respectively.

FIG. 7 shows the power tool system of a second embodiment.

FIG. 8 shows the charger of a third embodiment and is a cross sectional view that corresponds to FIG. 3.

FIG. 9 shows the charger of a third embodiment and is a cross sectional view that corresponds to FIG. 4.

DETAILED DESCRIPTION

Figure 1:
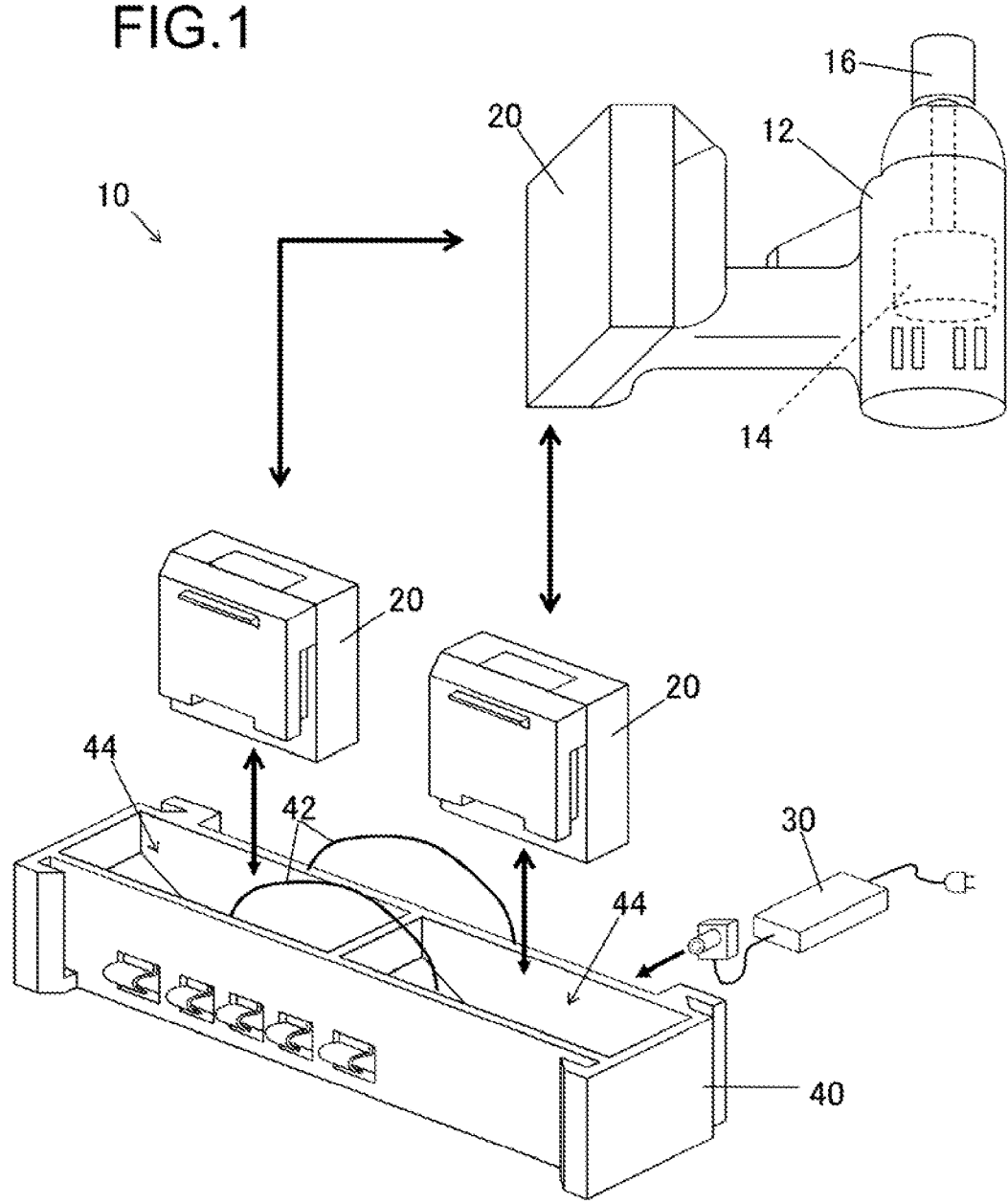
FIG. 1 shows a power tool system of a first embodiment.

In one embodiment of the present teachings, a battery pack housing (receiving) hole preferably has a first inner wall, which laterally contacts at least one outer surface of a battery pack. In this case, a charging output part (element) is preferably disposed on or in the first inner wall. Users can be expected to put the battery pack into the battery pack housing hole in a rough or careless manner. If the charging output part were to be instead provided on the bottom part of the battery pack housing hole, then the battery pack might forcefully strike or impact the charging output part and break the charging output part if the battery pack is simply dropped into the battery pack housing hole. On the other hand, by preferably providing the charging output part in or on an inner side wall of the battery pack housing hole, then it is not possible for the battery pack to forcefully strike or impact the charging output part even if the user puts the battery pack into the battery pack housing hole in a rough or careless manner. In addition, in such an embodiment, even if foreign matter were to enter the battery pack housing hole, it is possible to avoid a possibly problematic situation in which that the foreign matter could cover, or be disposed proximal to, the charging output part with adverse effects, as will be further discussed below.

In the above-mentioned embodiment, the first inner wall is preferably an inclined surface that forms an angle with respect to the vertical. If the first inner wall is inclined, then there is less of a chance that a gap will exist between the first inner wall and the battery pack, and thus the charging output part, which is provided on the first inner wall, can reliably communicate charging power to the battery pack.

In the above-mentioned embodiment, the battery pack housing hole preferably has a bottom part, which is adapted or configured to contact the battery pack from below. In this embodiment, the bottom part is preferably inclined or tilted from the vertical downward toward the first inner wall. According to this configuration, it is possible to prevent any gap between the first inner wall and the battery pack when the battery pack is disposed in its prescribed (e.g., lower-most) position, so that the charging output part, which is provided on the first inner wall, can reliably and efficiently communicate charging power to the battery pack.

In the embodiment, in which the battery pack housing hole includes the bottom part that is adapted or configured to contact the battery pack from below, at least one opening is preferably formed in the bottom part of the battery pack housing hole. According to this configuration or design, any foreign matter that enters the battery pack housing hole can be easily discharged to the outside by gravity through the opening in the bottom part.

In another embodiment of the present teachings, the battery pack housing hole preferably includes second and third inner side walls, which are located on the lateral sides of the first inner wall such that the second inner side wall faces or opposes the third inner side wall, e.g., the second inner side wall may extend parallel, at least in part, with the third inner side wall. In this case, at least one of the second and third inner walls is, or includes at least in part, an inclined surface (i.e. inclined or tilted from the vertical) and the distance between the second and third inner walls preferably decreases in the downward direction of the battery pack housing hole.

In another embodiment of the present teachings, the charging output part (element) preferably supplies charging power wirelessly to the battery pack. By using wireless power transmission, it becomes relatively easy to transmit power from the charger to the battery pack. The present teachings place no limitation on the wireless power transmission protocol or scheme that it is utilized to transmit charging power from the charger to the battery pack.

First Embodiment

A first representative, non-limiting embodiment of a power tool system 10 according to the present teachings will now be explained with reference to FIGS. 1-6. This power tool system 10 comprises a hand-held power tool 12, battery packs 20, and a charger 40. The power tool 12 comprises a motor 14, which drives a tool 16, e.g., a tool bit coupled to the motor 14 via a chuck. While the motor 14 is preferably an electrically-driven, rotary motor, it may instead be a solenoid or some other electric actuator. The battery packs 20 serve as power supplies for the power tool 12 and supply electric current (power) to the motor 14. The battery packs 20 can be attached to and detached from the power tool 12. The battery packs 20 have a plurality of secondary batteries (e.g., lithium ion cells) built in (housed therein) and are rechargeable. The battery packs 20, once they have been detached from the power tool 12, can be attached to and detached from the charger 40, or as further explained below, placed into (e.g., without attachment or engagement) and removed from the charger 40.

The charger 40 has two or more battery pack housing (receiving) holes (pockets or cradles) 44, which are adapted or configured to respectively receive the battery packs 20. The charger 40 can charge the battery packs 20 when the battery packs 20 are disposed, placed or housed in the battery pack housing holes 44. The charger 40 is connectable to an external AC power supply (e.g., an electrical outlet connected to a commercial power source or a portable generator) via an AC adapter 30 (e.g., an AC-DC converter). One or more carrying handles 42 is (are) preferably provided on the charger 40 to enable a person to easily carry the charger 40 from location to location (e.g., from a storage site to a work site).

As shown in FIGS. 2A and 2B, the charger 40 generally has the shape of a tray or a box with a partition therein. While the charger 40 of the present embodiment has two battery pack housing holes 44, the charger 40 may be provided with just one or even three or more battery pack housing holes 44 in other embodiments of the present teachings. Each of the battery pack housing holes 44 is adapted or configured to receive (accommodate or hold) one of the battery packs 20. Therefore, the charger 40 shown in FIGS. 1-6 can simultaneously hold and charge a maximum of two battery packs 20.

As shown in FIG. 2A, a pair of power output terminals 46, a plurality of front part communication terminals 48, and front part coupling (engaging) parts 50 are provided on a front surface 40a of the charger 40. As shown in FIG. 2B, a receptacle (jack or socket) 54 for the AC adapter 30, a pair of power input terminals 56, a plurality of rear part communication terminals 58, and rear part coupling (engaging) parts 52 are provided on a rear surface 40b of the charger 40. As will be understood, the power output terminals 46 are adapted or configured to be complementary to and/or engageable/contactable with the power input terminals 56, the front part communication terminals 48 are adapted or configured to be complementary to and/or engageable/contactable with the rear part communication terminals 58, and the front part coupling parts (engaging) 50 are adapted or configured to be complementary to and/or engageable/contactable with the rear coupling parts (engaging) 52. Naturally, various modifications of the structures of these elements shown in FIGS. 2A and 2B are possible and fall within the scope of the present teachings.

Figure 5:
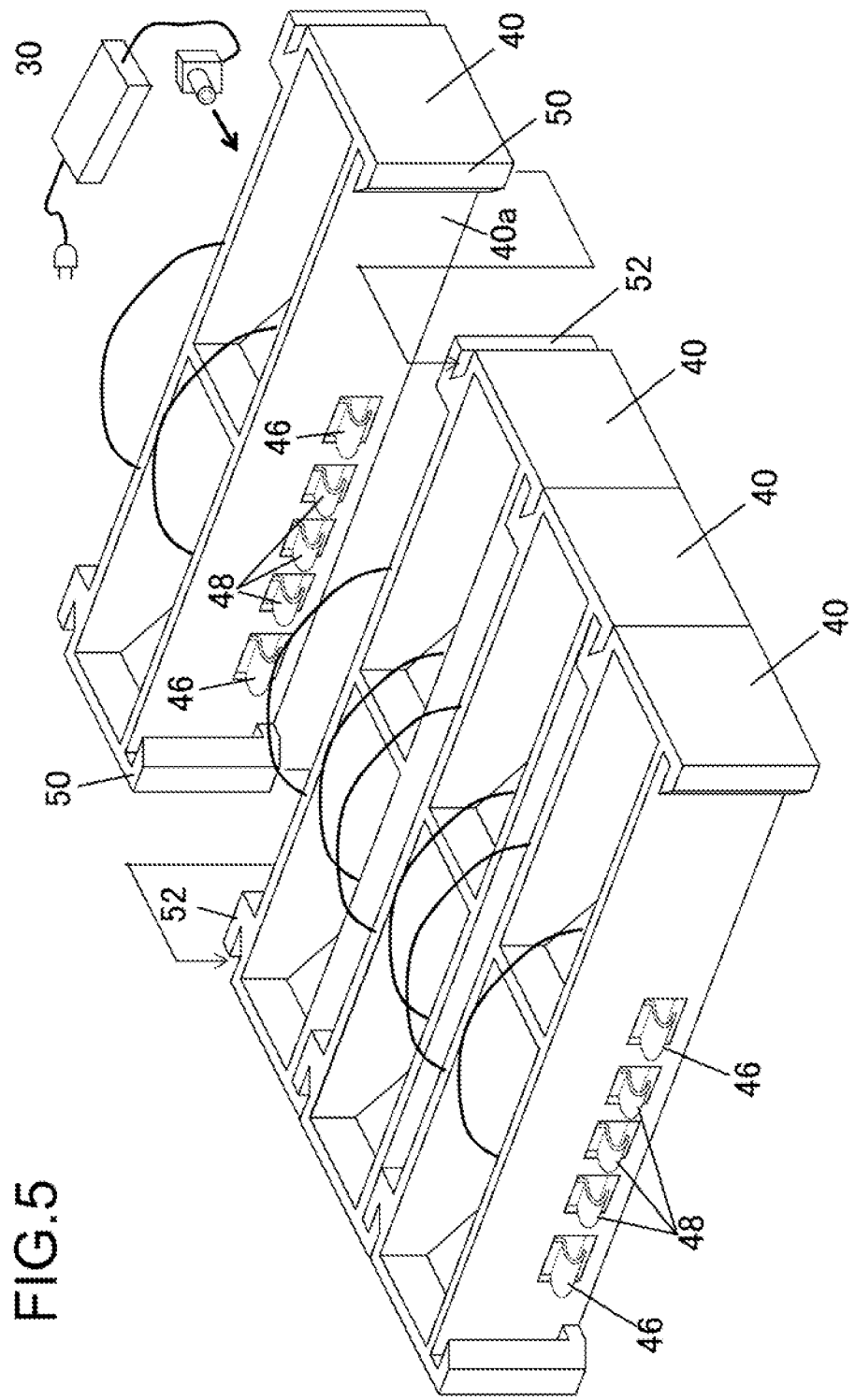
FIG. 5 shows multiple chargers, which are physically and electronically coupled in series.

As shown in FIG. 5, a plurality of the chargers 40 can be connected in series by physically (mechanically) coupling or engaging the front part coupling part(s) 50 of one of the chargers 40 to the rear part coupling part(s) 52 of another charger 40. When two chargers 40 are coupled or engaged in this manner, the pair of power output terminals 46 and the plurality of front part communication terminals 48 provided on the front surface 40a of one of the chargers 40 respectively contact and are electrically connected to the pair of power input terminals 56 and the plurality of rear part communication terminals 58 provided on the rear surface 40b of the other (adjacent) charger 40. Therefore, even if the AC adapter 30 is connected to only one of the chargers 40, it is still possible to supply electric current (power) to the other series-connected charger(s) 40.

In the present embodiment, a configuration or design is adopted wherein, when a plurality of the chargers 40 is connected in series, only the receptacle 54 for the AC adapter 30 provided on the one (end) charger 40 is exposed. That is, the receptacle 54 for the AC adapter 30 provided on the other series-connected charger(s) 40 is covered up by the adjacent charger 40. According to this configuration, the user can correctly attach the AC adapter 30 to the charger 40 to which the AC adapter 30 should be attached.

Figure 3:
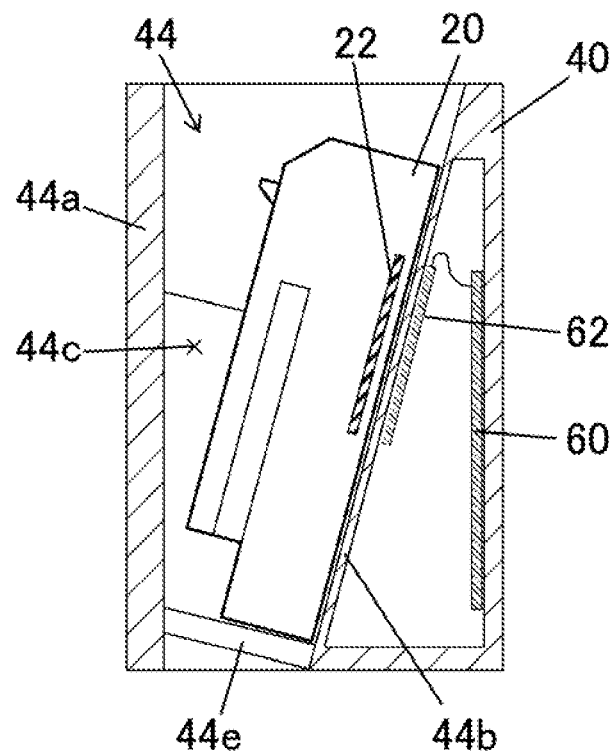
FIG. 3 shows a cross section of the charger, together with a battery pack, taken along the III-III line in FIG. 2A.
Figure 4:
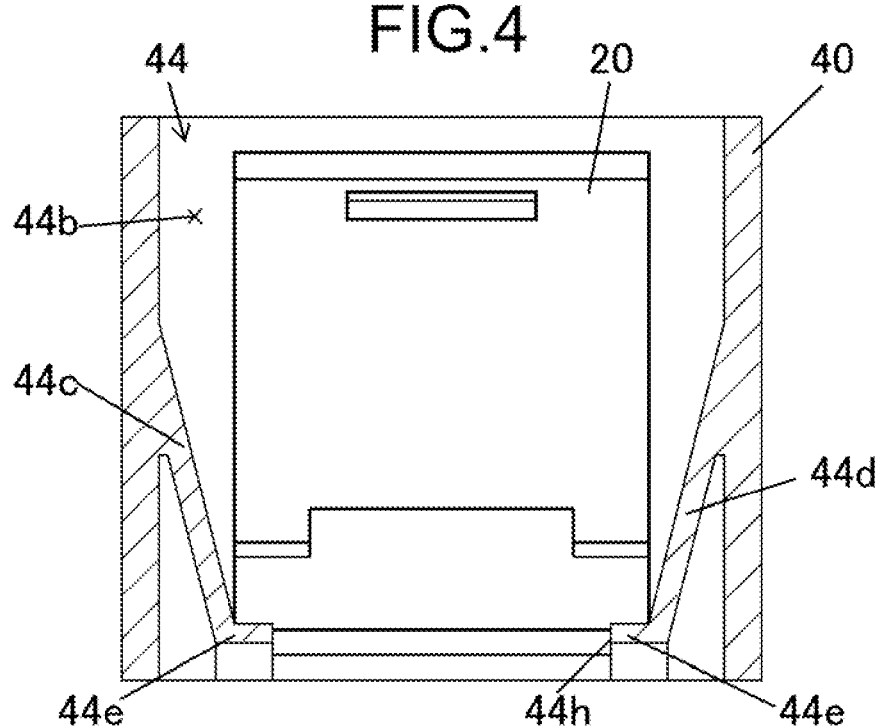
FIG. 4 shows a cross section of the charger, together with the battery pack, taken along the IV-IV line in FIG. 2A.

As shown in FIGS. 3 and 4, each battery pack housing hole 44 preferably has a front side inner wall 44a, which is located towards the front of the battery pack 20, a rear side inner wall 44b, which is located towards the rear of the battery pack 20, a right side inner wall 44c, which is located towards the right of the battery pack 20, a left side inner wall 44d, which is located towards the left of the battery pack 20, and a bottom wall 44e, which is located below the battery pack 20. The bottom wall 44e is, or at least partially defines, the bottom part of the battery pack housing hole 44 and contacts the battery pack 20 from below when the battery pack 20 is disposed in its prescribed (e.g., lowermost) position within the hole 44. The front side inner wall 44a and the rear side inner wall 44b face (mutually-oppose) one another, while the right side inner wall 44c and the left side inner wall 44d face (mutually-oppose) one another, e.g., the respective sets of walls may be generally or substantially parallel to each other.

A charging output part (element or circuit) 62 is provided in or on the battery pack housing hole 44. More preferably, the charging output part (element or circuit) 62 is provided on or in the rear side inner wall 44b of the battery pack housing hole 44. The charging output part 62 electrically connects to (communicates with) a charging input part (element or circuit) 22 of the battery pack 20 and outputs or transmits charging power to the battery pack 20. As one representative, non-limiting example, the power is transmitted wirelessly from the charging output part 62 to the charging input part 22, i.e. without physical contact between electrical terminals thereof. The charging output part 62 is electrically connected to a controller 60 of the charger 40, which is supplied with current from the AC adapter 30. The controller 60 controls the amount of charging power (or current) that is output (e.g., wirelessly transmitted) from the charging output part 62.

The controller 60 preferably includes one or more microprocessors (or any other digital and/or analog signal processing circuit), memory or storage that stores one or more charging programs to be executed by the microprocessor(s), etc., and at least one input/output device adapted or configured to communicate with the charging output part 62.

The charging output part 62 preferably comprise means for wirelessly outputting charging power, e.g., one or more coils, and the charging input part 22 preferably comprises means for wirelessly receiving charging power therefrom, e.g., one or more coils. The charging output part 62 preferably includes circuitry adapted or configured to selectively energize the coil(s) so as to cause a varying electromagnetic field to be generated by the coil(s). The charging input part 22 preferably includes circuitry adapted or configured to rectify an alternating current induced in its coil(s) by the varying electromagnetic field, and to smooth and regulate the resulting charging current that will be supplied to the battery cells of the battery pack 20. The wireless power transmission may be performed, e.g., according to the Qi interface standard or any other suitable wireless or inductive power transmission scheme.

The front side inner wall 44a of the battery pack housing hole 44 may be substantially vertical, although it could be inclined towards the front or rear of the charger 40, if desired. However, the rear side inner wall 44b is preferably not vertical but rather is an inclined surface that is tilted slightly from the vertical direction and has a slope that is sufficient for the battery pack 20 to slide down solely due to the force of gravity. That is, the angle of inclination of the rear side inner wall 44b is sufficient for the bottom surface of the battery pack 20 to overcome the frictional contact with the rear side inner wall 44b so that the battery pack 20 will slide down the rear side inner wall 44b, due to its own weight, so as to reliably reach the bottom wall 44e without human assistance. Naturally, for lower coefficients of friction between the bottom side of the battery pack 20 and the surface of the rear side inner wall 44b, the angle of inclination of the rear side inner wall 44b from the vertical direction can be made large, if desired. I.e. the tilt from the vertical can be greater.

Furthermore, the bottom wall 44e is preferably not horizontal (i.e. perpendicular to the vertical direction), but rather is inclined or tilted downward toward the rear side inner wall 44b. Preferably, the bottom wall 44e extends perpendicular, or at least substantially perpendicular to the rear side inner wall, so the lowermost surface of the battery pack 20 as shown in FIG. 3 flushly contacts, and rests on, the bottom wall 44e when the battery pack 20 is disposed in its prescribed or lowermost position within the battery pack housing hole 44.

According to this configuration or design, even if the user does not carefully put the battery pack 20 into the battery pack housing hole 44, the battery pack 20 will slide down the rear side inner wall 44b due to its own weight (gravity) so that the bottom surface of the battery pack 20 will closely contact the rear side inner wall 44b and the charging output part 62 and the charging input part 22 will be proximate to one another.

It should be understood that the bottom wall 44e does not have to be a flat surface. Rather, the bottom wall 44e could be, e.g., a curved surface or an uneven surface. In addition or in the alternative, the bottom wall 44e may have a mesh or lattice structure, i.e. there may be one or more openings in the bottom wall 44e.

Moreover, the bottom (lowermost) part or portion of the battery pack housing hole 44 is not limited to a wall having a shape according to any of the bottom walls 44e described in the preceding description. Instead, it could also comprise one or more pins, bars, or projections provided on the front side inner wall 44a and/or on the rear side inner wall 44b.

As shown in the battery pack housing hole 44 of FIG. 4, the right side inner wall 44c and the left side inner wall 44d also may be inclined surfaces, and the distance therebetween may preferably decrease in the downward direction. That is, the walls 44c and 44d may inwardly taper towards the bottom or lowermost portion of the hole 44. In this case, the battery pack 20 will also be guided downward in the lateral direction, by its intrinsic weight (gravity), to the prescribed position. Thus, if the cross sectional area of the battery pack housing hole 44 is designed so as to decrease or taper in the downward direction, then the battery pack 20 will be guided by its intrinsic weight to the correct position for achieving optimal wireless transmission of power. That is, the charging input part 22 of the battery pack 20 will be accurately aligned with the charging output part 62 of the charger 40 without the need for human intervention, so that the charging of the battery pack 20 is performed reliably and efficiently with a greatly reduced risk of human error.

Referring back to FIG. 3, it is noted that the charging output part 62 is preferably not provided on the bottom wall 44e, but rather is provided on the rear side inner wall 44b. As compared to the bottom wall 44e, the shock or impact that the rear side inner wall 44b receives or absorbs when a user drops the battery pack 20 into the hole 44 is relatively small. Therefore, by providing the charging output part 62 on the rear side inner wall 44b, damage to the charging output part 62 caused by shocks or impacts from the battery pack 20 can be minimized or even prevented.

Furthermore, because the rear side inner wall 44b is not expected to receive or absorb large shocks or impacts from the battery pack 20, the rear side inner wall 44b can be formed relatively thin, which would allow the distance between the charging input part 22 and the charging output part 62 to be shortened. As a result, the efficiency of the wireless power transmission between the charging input part 22 and the charging output part 62 can be increased. Naturally, the charging output part 62 need not be disposed on a back or rear surface of the rear side inner wall 44b as shown in FIG. 3; it could also be disposed partially or completely embedded within the rear side inner wall 44b and/or a surface of the charging output part 62 may be exposed on the surface of the rear side inner wall 44b that is designed to contact the battery pack 20.

By placing the charging output part 62 on or in the rear side inner wall 44b, another advantage results. That is, during normal operation, e.g., at a construction site or near an assembly line, it is expected that some foreign matter, such as metal fragments, could fall into the battery pack housing hole 44. If a metal fragment were to be present between the charging input part 22 and the charging output part 62, then such metal fragment(s) would be subjected to electromagnetic induction and could be heated to a relatively high temperature. However, because the charging output part 62 is not provided on the bottom wall 44e, but rather is provided on or in the rear side inner wall 44b, even if foreign matter, such as a metal fragment, enters the battery pack housing hole 44, that foreign matter will likely slide down to the bottom or lowermost portion of the hole 44 due to gravity and thus not remain on or near the charging output part 62, thereby minimizing undesirable consequences. Furthermore, if an optional opening (aperture) 44h is formed or defined in the bottom wall 44e, even if foreign matter enters the battery pack housing hole 44, that foreign matter will be readily discharged therefrom due to gravity.

Figure 6:
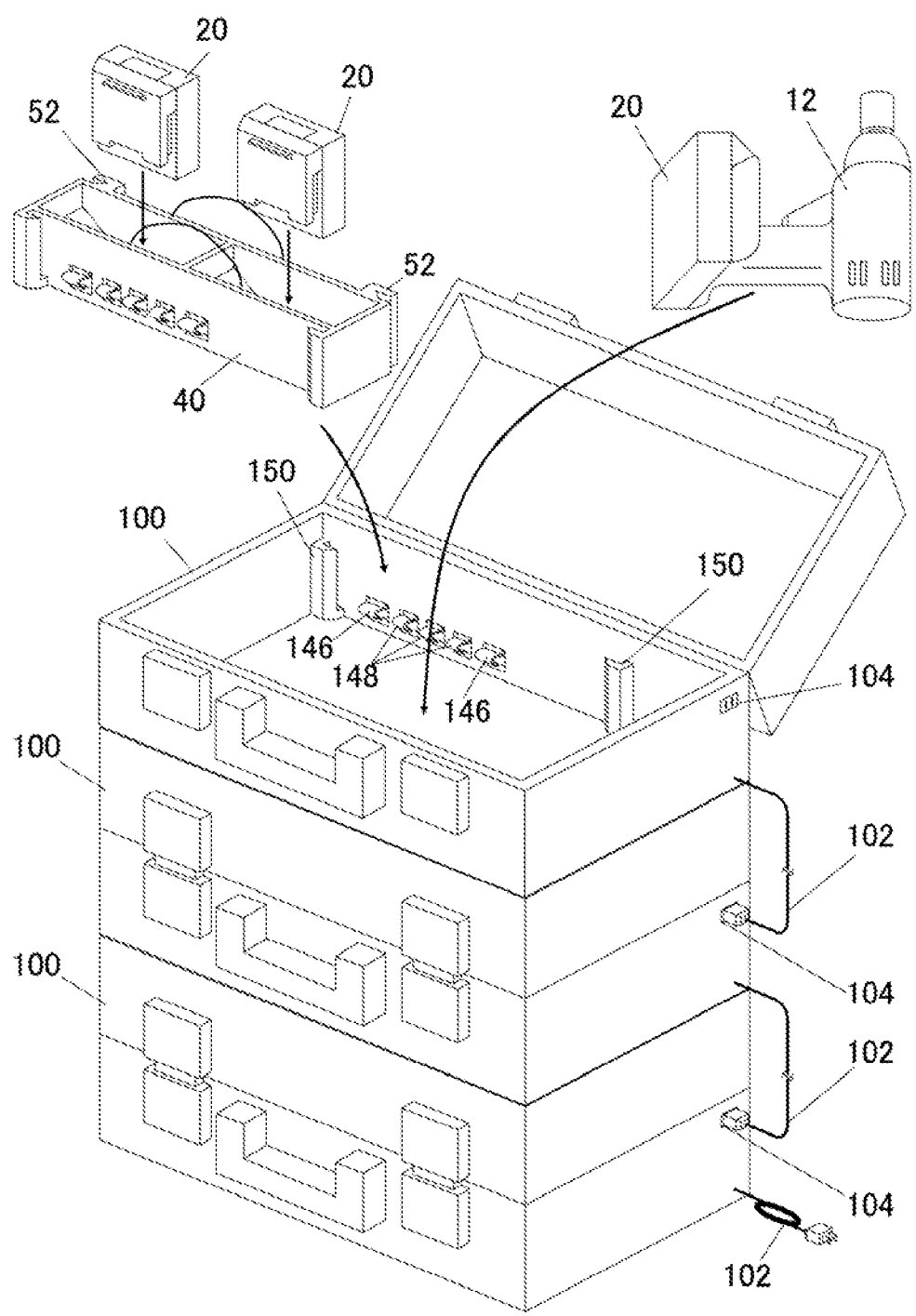
FIG. 6 shows a stack of carrying cases for the power tool system of the first embodiment.

A further development of the first embodiment is shown in FIG. 6. As shown therein, the power tool system 10 of the present embodiment can be housed and transported in a carrying case 100. Engaging parts 150, a pair of power output terminals 146, and a plurality of communication terminals 148 are preferably provided inside the carrying case 100. The engaging parts 150 are adapted or configured to couple (engage) with the rear part coupling parts 52 of the charger 40 and thereby fix the charger 40 in position within the carrying case 100. In this fixed position, the charger 40 will be electrically connected to the carrying case 100 via the pair of power output terminals 146 and the plurality of communication terminals 148. The carrying case 100 further comprises a power supply cord 102 that is connectable to an external power supply (e.g., an electrical outlet of a commercial power supply or a portable generator). Furthermore, the carrying case 100 comprises an AC socket (receptacle or jack) 104, which outputs an AC power supply, in order to supply AC power to another (adjacent) carrying case 100. As shown in FIG. 6, the carrying cases 100 preferably can be stacked in order to enable a plurality of battery packs 20 to be recharged simultaneously. Such an arrangement is advantageous when power tool systems 10 must be transported to a work site, because the carrying cases 100 can be stacked, e.g., in a truck or lorry, in order to simultaneously and conveniently recharge a plurality of battery packs 20 while in transit to/from the work site.

Second Embodiment

A power tool system 210 according to a second embodiment of the present teachings will be explained with reference to FIG. 7, in which the same reference numbers will be utilized for the same elements/components as the preceding embodiment, such that it is not necessary to repeat the description of such elements/components.

The system 210 of the present embodiment comprises the hand-held power tool 12, the battery packs 20, a tray shaped charger 240, a carrying case 200, and a rapid charger 280. In this embodiment, engaging parts 250, which are adapted or configured physically (mechanically) couple or engage with corresponding rear side engaging parts on the charger 240, are provided on the side surface 200a of the carrying case 200. Therefore, the tray shaped charger 240 can be attached to and detached from the side surface 200a of the carrying case 200, thereby saving space inside of the carrying case 200.

The tray shaped charger 240 comprises two battery pack housing (receiving) holes 244. The configuration of the tray shaped charger 240 is basically the same as that of the charger 40 of the first embodiment. However, the charger 240 of the present embodiment has an AC/DC converter built in and is connectable to the external power supply via a power supply cord 230. Furthermore, the charger 240 comprises an AC socket 232, which outputs an AC power supply, and thereby can supply AC power to another (adjacent) charger 240. Moreover, the rapid charger 280 comprises a cooling mechanism for the battery pack 20, which enables the battery pack 20 to be charged in less time than the tray shaped charger 240 can. The rapid charger 280 may be substantially the same as chargers known in the art.

Third Embodiment

A charger 340 according to a third embodiment of the present teachings will be explained with reference to FIGS.

8 and 9. The charger 340 of the third embodiment differs from the charger 40 of the first embodiment in that the charger 340 uses a contact type terminal as a charging output part 362. That is, charging current is conducted from the charger 60 to the battery pack 20 via a wired connection. The charging output part 362 thus preferably includes contact terminals adapted or configured to contact and electrically connect to corresponding contact terminals on the battery pack 20. For example, the contact terminals of the battery pack 20 and the charging output part 362 may be designed in the same manner as known power tool charging configurations.

The remaining structures, elements and components of the third embodiment may be substantially the same as those of the charger 40 of the first embodiment.

With respect to all of the disclosed aspects and embodiments of the present teachings, the wall (e.g., rear side inner wall 44b) that contacts the surface of the battery pack 20, which surface has the charging input part (element) 22 disposed therein or proximal thereto, when the battery pack 20 has moved downwardly to its lowermost position within the battery pack housing (receiving) hole 44 preferably forms an angle with the vertical direction of the charger 40 (and the hole 44) that is greater than or equal to 10 degrees and less than or equal to 70 degrees, more preferably between 20-60 degrees, even more preferably between 30-45 degrees. An optimal angle of inclination will cause the battery pack 20 to overcome friction and slide down the wall to its lowermost position while also ensuring that the bottom surface 20 makes good contact with the wall (e.g., 44b) due solely to the force of gravity pressing the battery pack 20 against the wall (e.g., 44b). Therefore, the angle of inclination may be determined, in part, by the coefficient of friction between the battery pack surface and the wall (e.g., 44b) surface.

Furthermore, the right side inner wall 44c and/or the left side inner wall 44d is/are also preferably inclined or tilted from the vertical direction of the of the charger 40 (and the hole 44) by an angle of inclination that is greater than or equal to 0.5 degrees and less than or equal to 70 degrees, more preferably between 5-45 degrees, even more preferably between 5-30 degrees.

Although the wall that contacts the surface of the battery pack 20, which surface has the charging input part (element) 22 disposed therein or proximal thereto, when the battery pack 20 has moved downwardly to its lowermost position within the battery pack housing (receiving) hole 44 was the rear side inner wall 44b in the above-described embodiments, the present teachings are not limited in this regard and any of the side walls 44a, 44b, 44c, 44d may serve as the battery pack contacting wall. The wall that contains, or has the charging output part (element) 62 attached thereto, will be selected based upon the configuration of the battery pack 20, in particular the location of the charging input part (element) 22 in or on the battery pack 20.

Additional representative embodiments of the present teachings disclosed herein include, but are not limited to:

1. A cordless power tool system, comprising:
a power tool;
a battery pack, which can be attached to and detached from the power tool; and
a charger, which charges the battery pack;
wherein
the charger has a battery pack housing hole, which receives the battery pack, and a charging output part, which outputs charging power to the battery pack that has been put into the battery pack housing hole;

the battery pack housing hole has a cross sectional area that decreases downward, and thereby the battery pack is guided by its intrinsic weight to a prescribed position; and the charging output part is disposed such that it electrically connects with the battery pack that has moved to the prescribed position.

2. A cordless power tool system according to embodiment 1, wherein
the battery pack housing hole has a first inner wall, which contacts the battery pack from the side; and
the charging output part is disposed on the first inner wall.

3. A cordless power tool system according to embodiment 2, wherein
the first inner wall is an inclined surface that forms an angle with the vertical.

4. A cordless power tool system according to embodiment 2 or embodiment 3, wherein
the battery pack housing hole has second and third inner walls, which are located on either side of the first inner wall and face one another;
at least one of the inner walls selected from the group consisting of the second and third inner walls is an inclined surface; and
the distance between the second and third inner walls decreases downward.

5. A cordless power tool system according to any one of embodiment 2 to embodiment 4, wherein
the battery pack housing hole has a bottom part that contacts the battery pack from below; and
the bottom part is inclined downward toward the first inner wall.

6. A cordless power tool system according to any one of embodiment 1 to embodiment 5, wherein
the battery pack housing hole has the bottom part that contacts the battery pack from below; and
at least one opening is formed in the bottom part.

7. A cordless power tool system according to any one of embodiment 1 to embodiment 6, wherein
the charging output part supplies charging power wirelessly to the battery pack.

8. A battery pack system for a cordless power tool, comprising:
a battery pack, which can be attached to and detached from the power tool; and
a charger, which charges the battery pack;
wherein
the charger has a battery pack housing hole, which receives the battery pack, and a charging output part, which outputs charging power to the battery pack that has been put into the battery pack housing hole;

the battery pack housing hole has a cross sectional area that decreases downward, and thereby the battery pack is guided by its intrinsic weight to a prescribed position; and the charging output part is disposed such that it electrically connects to the battery pack that has moved to the prescribed position.

9. A charger that charges a battery pack for a cordless power tool, comprising:
a battery pack housing hole, which receives the battery pack; and
a charging output part, which outputs charging power to the battery pack that has been put into the battery pack housing hole;

wherein
the battery pack housing hole has a cross sectional area that decreases downward,
and thereby the battery pack is guided by its intrinsic weight to a prescribed position; and
the charging output part is disposed such that it electrically connects to the battery pack that has moved to the prescribed position.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved chargers, battery pack charging systems and cordless power tool systems, as well as methods for manufacturing and using the same.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE SIGNS LIST 10, 210: Power tool system
12: Power tool
14: Motor
16: Tool
20: Battery pack
22: Charging input part
30: AC adapter
40, 240, 340: Charger
40a: Front surface of charger
40b: Rear surface of charger
42: Handle
44, 244: Battery pack housing (receiving) holes
44a: Front side inner wall
44b: Rear side inner wall
44c: Right side inner wall
44d: Left side inner wall
44e: Bottom wall
44h: Opening
46: Power output terminal
48: Front part communication terminal
50: Front part coupling part
52: Rear part coupling part
54: Receptacle
56: Power input terminal
58: Rear part communication terminal
60: Controller
62, 362: Charging output part
100, 200: Carrying case
102, 230: Power supply cord
104, 232: Socket
146: Power output terminal
148: Communication terminal
150: Fixed part
200a: Side surface of carrying case
280: Rapid charger

The invention claimed is:

1. A charger for charging a battery pack that is detachably attachable to a cordless power tool, the charger comprising:
at least a first side wall that at least partially defines a battery pack receiving hole shaped to receive and accommodate the battery pack, and
a charging output element adapted to supply charging power to the battery pack,
wherein the battery pack receiving hole has a lateral cross sectional area that decreases downwardly in the vertical direction of the battery pack receiving hole such that gravity will cause the battery pack to be guided to a prescribed position within the battery pack receiving hole,
the charging output element is positioned so as to be proximal to a corresponding charging power input element of the battery pack when the battery pack is disposed in the prescribed position,
the battery pack receiving hole comprises a bottom part that is adapted to support a lowermost portion of the battery pack when the battery pack is disposed in the prescribed position, and
at least one opening is defined in the bottom part at a location that is lower in the vertical direction than the charging output element.

2. The charger according to claim 1, wherein the charging output element is disposed on or in the first side wall, which is oriented so as to contact a surface of the battery pack when the battery pack is disposed in the prescribed position.

3. The charger according to claim 2, wherein the first side wall is inclined relative to the vertical direction.

4. The charger according to claim 3, wherein the first side wall is inclined relative to the vertical direction by an angle of inclination of between 10-70 degrees.

5. The charger according to claim 2, wherein:
the bottom part is inclined downwardly in the vertical direction towards the first wall.

6. The charger according to claim 1, further comprising:
a second side wall coupled to the first wall, and
a third side wall coupled to the first wall and facing the second side wall,
wherein at least one of the second and third side walls is inclined relative to the vertical direction such that the distance between the second and third inner walls decreases downwardly in the vertical direction.

7. The charger according to claim 6,
wherein both of the second and third side walls are inclined relative to the vertical direction by an angle of inclination of between 0.5-70 degrees.

8. The charger according to claim 1, further comprising:
at least one first engaging part disposed on a first outer surface and
at least one second engaging part disposed on a second outer surface and being adapted to detachably engage at least one first engaging part of another charger in order to physically couple the two chargers together.

9. The charger according to claim 1, further comprising:
at least one power output terminal disposed on a first outer surface and
at least one power input terminal disposed on a second outer surface and being adapted to electrically connect to at least one power output terminal of another charger in order to conduct current from one charger to the other charger.

10. The charger according to claim 1, further comprising:
a current input receptacle disposed on a second outer surface at a location that will be covered by another charger when the charger is physically and electrically coupled to the other charger.

11. The charger according to claim 1, wherein:
a second battery pack receiving hole is defined in the charger and is shaped to receive and accommodate a second battery pack, and
the charger is adapted to simultaneously charge two battery packs.

12. The charger according to claim 11, wherein the charger is tray-shaped and further comprises at least one carrying handle.

13. The charger according to claim 1, wherein the charging output element is adapted to wirelessly transmit charging power to the battery pack.

14. The charger according to claim 13, wherein the charging output element comprises at least one induction coil.

15. The charger according to claim 1, wherein the charging output element is adapted to conduct charging current to the battery pack via a wired connection.

16. A battery pack charging system, comprising:
the charger according to claim 1, and
a battery pack adapted to be detachably attachable to a cordless power tool and having a charging input element adapted to receiving charging power from the charging output element of the charger.

17. The battery pack charging system according to claim 16, wherein the charging input element comprises at least one induction coil.

18. A cordless power tool system, comprising:
the battery pack charging system according to claim 16, and
a power tool adapted to be electrically driven by the battery pack.

19. The cordless power tool system according to claim 18, further comprising:
a carrying case adapted to carry the power tool, the battery pack and the charger.

20. The cordless power tool system according to claim 19, wherein the charger is adapted to be detachably engaged with at least one engaging part disposed inside of the carrying case.

21. The cordless power tool system according to claim 19, wherein the charger is adapted to be detachably engaged with at least one engaging part disposed on an outer surface of the carrying case.

22. The cordless power tool system according to claim 18, further comprising:
a power cord adapted to electrically connect the carrying case to another carrying case so that current is conducted from the carrying case to the other carrying case.

23. A charger for charging a battery pack that is detachably attachable to a cordless power tool, the charger comprising:
at least a first side wall that at least partially defines a battery pack receiving hole shaped to receive and accommodate the battery pack,
a second side wall coupled to the first wall,
a third side wall coupled to the first wall and facing the second side wall, and
a charging output element adapted to supply charging power to the battery pack,
wherein the battery pack receiving hole has a lateral cross sectional area that decreases downwardly in a vertical direction of the battery pack receiving hole such that gravity will cause the battery pack to be guided to a prescribed position within the battery pack receiving hole,
the charging output element is positioned so as to be proximal to a corresponding charging power input element of the battery pack when the battery pack is disposed in the prescribed position, and
both of the second and third side walls are inclined relative to the vertical direction by an angle of inclination such that the distance between the second and third inner walls decreases downwardly in the vertical direction.

24. The charger according to claim 23, wherein the angle of inclination is between 0.5-70 degrees.

25. A cordless power tool system, comprising:
a charger for charging a battery pack that is detachably attachable to a cordless power tool, the charger comprising:
at least a first side wall that at least partially defines a battery pack receiving hole shaped to receive and accommodate the battery pack, and
a charging output element adapted to supply charging power to the battery pack,
wherein the battery pack receiving hole has a lateral cross sectional area that decreases downwardly in a vertical direction of the battery pack receiving hole such that gravity will cause the battery pack to be guided to a prescribed position within the battery pack receiving hole, and
the charging output element is positioned so as to be proximal to a corresponding charging power input element of the battery pack when the battery pack is disposed in the prescribed position;
a battery pack adapted to be detachably attachable to a cordless power tool and having a charging input element adapted to receiving charging power from the charging output element of the charger;
a power tool adapted to be electrically driven by the battery pack; and
a carrying case adapted to carry the power tool, the battery pack and the charger, wherein the charger is adapted to be detachably engaged with at least one engaging part disposed on an outer surface of the carrying case.

* * * * *